Patented Apr. 28, 1953

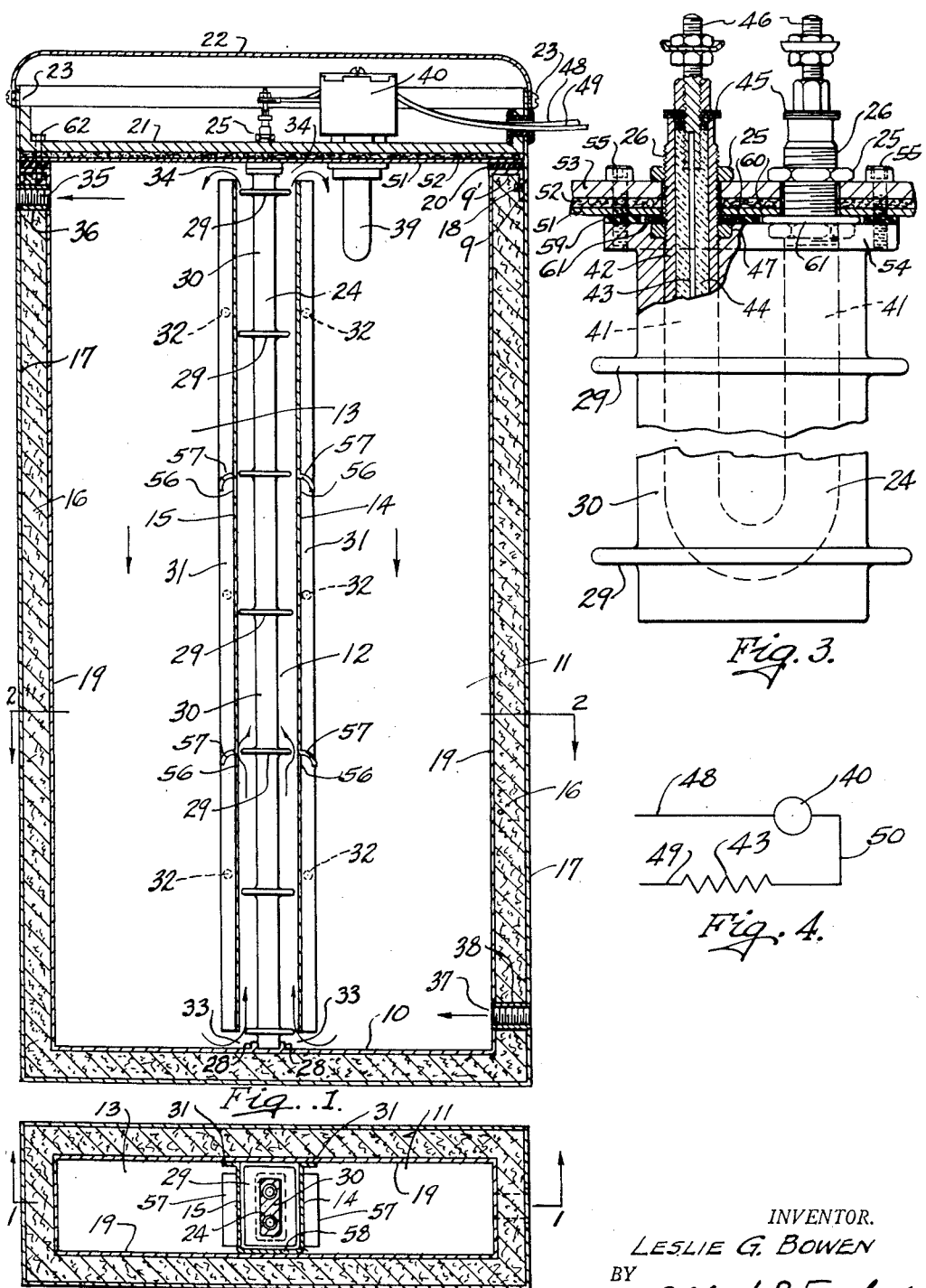

2,636,974

UNITED STATES PATENT OFFICE 2,636,974

ELECTRIC LIQUID HEATER

Leslie G. Bowen, Evanston, Ill.

Application February 12, 1951, Serial No. 210,595

10 Claims. (Cl. 219—38)

My invention relates to liquid heaters, and more particularly to an electric liquid heater.

It is the principal purpose of my invention to provide a heater for heating liquid to a high temperature rapidly, that is adapted to be located in a restricted space, particularly a space that is restricted in a horizontal dimension. In connection with the use of glasses, dishes and other utensils, in public places, it is a health requirement in many communities that these glasses, dishes and utensils be sterilized by means of water at a high temperature slightly below the boiling point of water. The ordinary tank water heater does not heat water to a high enough temperature at the point of use without the possibility of boiling the water in the heater, to accomplish this purpose. Accordingly one of the important uses of my heater is to raise the temperature of the water obtained from an ordinary hot water system supplied by means of a tank heater, rapidly, to a temperature such that it is high enough for sterilization of glasses and similar vessels.

In order to accomplish this, ordinarily relatively small quantities of water, at a temperature slightly below the boiling point, are required at frequent intervals, and my liquid heater is constructed to accomplish such heating. This heater can also be used for small cabins, trailers or laboratories, where small quantities of hot water are required intermittently. It is especially adaptable for automatic clothes washers, which go through a series of operations automatically and use large quantities of hot water during the rinse cycle.

While my improved liquid heater is particularly adapted for use for heating water for the above referred to purposes, in restricted spaces in which the heater has to be placed, if it is to be closely adjacent the point of use of the water, it is also adapted for use in heating other liquids for other purposes to high temperatures rapidly.

In order to accomplish the above referred to purpose, my improved liquid heater comprises a housing that is vertically divided into three compartments by means of two vertical partitions, between which the heating means is located. The inlet and outlet connections are located on opposite sides of the housing at the bottom and top thereof, respectively, so that cold liquid flowing into the housing at the bottom forces the hot liquid out of the top. The cold liquid enters the compartment in which the heating means is located at the bottom, and as it comes in contact with the heating means it is heated and rises past the numerous fins on the heating means, flowing around said fins, and emerges through vertically spaced openings in the partitions and through the open top. The hot water from the heating compartment then quickly intermixes with the water in the other two compartments as it circulates through these, and this process is repeated until a predetermined temperature is reached. A thermostatic element is provided in the inlet compartment remote from the inlet connection to control the operation of the heating element to open the circuit when the predetermined temperature of the water is reached. Also, if the body of liquid is in storage and falls below this predetermined temperature, the thermostatic controlling means will again complete the circuit to the heating means and thus maintain the liquid at the predetermined temperature.

It is another important purpose of my invention to provide heating means that is so constructed and arranged that the same can be readily removed from the compartment and cleaned. It will be obvious that with such an arrangement any scale or other deposit that may form on the heating means can be readily scraped off upon removal of the heating means from the compartment. This is aided by the shape of the heating unit, all the faces of which are flat, the side and end walls of the body portion of the unit being flat faced and the fins having flat top and bottom faces, all of said faces being readily accessible.

It is another purpose of my invention to provide a heating unit that comprises a body portion of metal that is a very good heat conductor, such as aluminum, or alloys that include aluminum, and are of high heat conductivity, in which is cast the heating element that is provided with an outer metallic sheath, in which the resistance element is provided. The resistance element is insulatingly mounted within the sheath so that the heating element with the sheath thereon can be cast directly in the aluminum, or similar metallic body portion of the heating device, and yet be electrically insulated therefrom. As a result of this mounting of the heating element, or elements, in the metallic body portion of the heating device, the heating element is in direct heat conducting relation to the metal of the heating device and the body portion of the heating device or baffle and the fins thereon are both heated to substantially the same temperature throughout. The metallic body portion being in direct contact with the water, transfers all of the heat of the heating element to the water.

Other objects and advantages of my invention will appear as the description of the drawings proceeds. I desire to have it understood, however, that I do not intend to limit myself to the particular details shown or described, except as defined in the claims.

In the drawings:

Fig. 1 is a vertical section of my improved single element heater, taken on the line 1—1 of Fig. 2.

Fig. 2 is a horizontal section thereof on the line 2—2 of Fig. 1.

Fig. 3 is a fragmentary view partly in section of the heating element, on an enlarged scale, and Fig. 4 is a the wiring diagram of the heater circuit.

Referring in detail to the drawings, my improved liquid heater, shown in Figs. 1 and 2, comprises a housing 10 divided into three compartments 11, 12 and 13 by partitions 14 and 15. The housing 10 is of double wall construction, with heat insulating material 16 between said walls. The outer wall 17 is fastened to the inner wall 19 by suitable fastening elements 18 extending into the vertical flange 9 on said wall. A gasket 20 is provided between the detachable top wall 21 and the inner wall 19. The top wall 21 is of double wall construction with heat insulating material 52 between the inner wall 51 and the outer wall 53. Fastening elements 62 secure the top wall 21 to the horizontal flange portion 9' of the inner wall 19. A cover 22 is secured to the top wall 53 by the fastening elements 23, which also fasten the top wall 53 to the outer wall 17.

A heating unit 24 is provided between the partitions 14 and 15 and has an enlarged head 54 that is secured to the double top wall 21, as shown in Fig. 3, by the nuts 25, which engage threaded portions 26 of the heating element, which project through the double top wall 21. Cap screws 55 project through the double wall 21 and screw-threadedly engage the flange 54 to further secure the heating unit 24 to the top wall 21. Sheet gasket material 59 is provided between the flange 54 of the heating unit and the inner wall 51. Openings 60 are provided in the gasket 59 for the copper asbestos ring gaskets 61. The heating unit 24 is held in position at the bottom by the ribs 28 formed on the inner wall 19. Parallel fins 29 are formed on the metallic body portion 30 of the heating unit 24 at uniformly spaced points along the height thereof. As shown in Fig. 2 the fins 29 on the heating unit 24 are rectangular, extending entirely around the same, and lie adjacent the inner wall 19 and the partitions 14 and 15. About one-eighth of an inch clearance is provided between the fins 29 and the inner wall 19 and the partitions 14 and 15.

The partitions 14 and 15, as seen in Fig. 2, are made of sheet metal and are the legs of a flanged channel member. The flanges 31 on the partitions 14 and 15 are spot welded to the inner wall 19 at 32. The web portion 58 of the channel section is also spot welded to the inner wall 19. A space 33 is provided below the partitions 14 and 15 to provide a water passage at the bottom of the heating element 24. At the top a water passage 34 is provided between the partitions 14 and 15 and the top wall 21. Vertically spaced openings or slots 56 are provided by the downwardly curved lips 57 punched out of the partitions 14 and 15, thus forming louvers.

An outlet 35 is provided from the chamber 13 near the top thereof consisting of a pipe nipple 36 welded to the inner wall 19. Similarly an inlet 37 is provided to the chamber 11 near the bottom thereof consisting of a pipe nipple 38 welded to the inner wall 19. Also provided in the chamber 11 is a thermostatic element 39, which projects through the top wall 21, which controls the operation of the switch 40.

The metallic body portion 30 of the heating unit 24 has a heating element 41 of a well known type cast within it. The heating element 41, as shown in Fig. 3, consists of a hollow metal tube 42 containing a resistance wire 43 and ceramic insulating material 44 between said wire and said tube. Eelectrical insulating means 45 is provided between the terminal 46 and the tube 42. The hexagonal nut 47 is welded into the tube 42 to prevent rotation of the tube after it is cast integral with the metallic body portion 30 of the heating unit 24. As shown in Fig. 4, the circuit for the heating means consists of conductors 48 and 49 leading from a suitable source of electrical energy and a thermostatic switch 40 connected in series with the heating element 43 by the conductor 50.

In the operation of my liquid heater, as shown in Figs. 1 and 2, water ordinarily preheated from an ordinary hot water system, enters the inlet 37 to compartment 11 at approximately 140° F. The water circulates in chambers 11 and 13 over the tops of the partitions 14 and 15. The cool water in the chambers 11 and 13 enters the chamber 12 through the openings 33 in the partitions 14 and 15. The water then progresses upward around the heating units 24 and violent circulation takes place around the metallic body portion 30 in the various compartments formed by the parallel fins 29. As the water circulates upward about the heating means 24 and from compartment to compartment, a portion thereof passes through the openings 56 and is directed downwardly in the chambers 11 and 13 by means of the lips 57 for recirculation. Circulation continues in this manner until all the water in the three compartments of the heater is heated to the temperature at which the thermostatic switch 40 is set, usually approximately 190° to 195° Fahrenheit. When this predetermined temperature is reached the heating element 43 is cut off and remains off until the temperature falls below the predetermined setting by having water drawn off at the outlet 35.

What I claim is:

1. In a liquid heater, a housing, a pair of partitions dividing said housing into an inlet compartment, an outlet compartment and a heating compartment between said inlet and outlet compartments, and a heating unit in said heating compartment extending lengthwise thereof and having fins thereon extending transversely of said compartment into adjacency to the walls thereof, said heating unit having an electric heating element cast therein.

2. In a liquid heater, a housing, a pair of partitions dividing said housing into an inlet compartment, an outlet compartment and a vertically elongated heating compartment between said inlet and outlet compartments having communication with said inlet and outlet compartments at the bottom and top and at vertically spaced points between the top and bottom of said heating compartment, and a heating unit in said heating compartment extending lengthwise thereof and having fins thereon extending transversely of said compartment into adjacency to the walls thereof, said heating unit having an electric heating element cast therein.

3. In a liquid heater, a housing, a pair of partitions dividing said housing into an inlet compartment, an outlet compartment and a heating compartment between said inlet and outlet compartments, said housing comprising a body portion and a detachable wall portion mounted thereon, and a heating unit in said heating compartment extending lengthwise thereof and having fins thereon extending transversely of said compartment into adjacency to the walls thereof, said heating unit having an electric heating element cast therein, said heating unit being mounted on said detachable wall portion for removal from said housing therewith as a unit.

4. In a liquid heater, a vertically elongated housing, a pair of vertically extending partitions dividing said housing into a vertically elongated inlet compartment, a vertically elongated outlet compartment and a vertically elongated heating compartment between said inlet and outlet compartments, and a vertically elongated heating unit in said heating compartment extending lengthwise thereof and having horizontally extending fins thereon extending into adjacency to the walls thereof, said heating unit having an electric heating element cast therein.

5. In a liquid heater, a vertically elongated housing, a pair of vertically extending partitions dividing said housing into a vertically elongated inlet compartment, a vertically elongated outlet compartment and a vertically elongated heating compartment between said inlet and outlet compartments having communication with said inlet and outlet compartments at the bottom and top thereof and at vertically spaced points between the bottom and top thereof, and a vertically elongated heating unit in said heating compartment extending lengthwise thereof and having horizontally extending vertically spaced fins thereon extending into adjacency to the walls thereof, said heating unit having an electric heating element cast therein.

6. In a liquid heater, a vertically elongated housing, a pair of vertically extending partitions dividing said housing into a vertically elongated inlet compartment, a vertically elongated outlet compartment and a vertically elongated heating compartment between said inlet and outlet compartments having communication with said inlet and outlet compartments at the bottom and top and at vertically spaced points between the top and bottom thereof, said housing comprising a body portion having integral side, end and bottom walls and a detachable top wall, and a vertically elongated heating unit in said heating compartment extending lengthwise thereof and having horizontally extending fins thereon extending into adjacency to the walls thereof, said heating unit having an electric heating element cast therein, said heating unit being mounted on said detachable top wall for removal from said housing therewith as a unit.

7. In a liquid heater, a vertically elongated housing, a pair of vertically extending partitions dividing said housing into a vertically elongated inlet compartment, a vertically elongated outlet compartment and a vertically elongated heating compartment between said inlet and outlet compartments, said inlet compartment having an inlet connection near the bottom thereof and said outlet compartment having an outlet connection near the top thereof, said connections being remote from said heating compartment, said heating compartment having communication with said inlet and outlet compartments at the bottom and top thereof and at vertically spaced points between said bottom and top, and a vertically elongated heating unit in said heating compartment extending lengthwise thereof and having horizontally extending fins thereon extending into adjacency to the walls thereof, said heating unit having an electric heating element cast therein.

8. In a liquid heater, a vertically elongated housing, a pair of vertically extending partitions dividing said housing into a vertically elongated inlet compartment, a vertically elongated outlet compartment and a vertically elongated heating compartment between said inlet and outlet compartments having communication with said inlet and outlet compartments at the bottom and top and at vertically spaced points between the top and bottom thereof, said housing comprising a body portion having integral side, end and bottom walls and a detachable top wall, a vertically elongated heating unit in said heating compartment extending lengthwise thereof and having horizontally extending fins thereon extending into adjacency to the walls thereof, said heating unit having an electric heating element cast therein, said heating unit being mounted on said detachable top wall for removal from said housing therewith as a unit, and means projecting from said bottom wall and engaging said heating unit to hold said heating unit in a predetermined position in said heating compartment.

9. In a liquid heater, a housing, a pair of partitions dividing said housing into an inlet compartment, an outlet compartment and a heating compartment between said inlet and outlet compartments, and a heating unit in said heating compartment extending lengthwise thereof and having a flat faced body portion having flat faced fins thereon extending transversely of said compartment into adjacency to the walls thereof, said heating unit having an electric heating element cast therein.

10. In a liquid heater, a vertically elongated housing, a pair of vertically extending partitions dividing said housing into a vertically elongated inlet compartment, a vertically elongated outlet compartment and a vertically elongated heating compartment between said inlet and outlet compartments, said partitions having vertically spaced horizontal slots therein, means on said partitions for deflecting liquid passing through said slots from said heating compartment into said inlet and outlet compartments downwardly, and a vertically elongated heating unit in said heating compartment extending lengthwise thereof and having horizontally extending fins thereon extending into adjacency to the walls thereof, said heating unit having an electric heating element cast therein.

LESLIE G. BOWEN.

References Cited in the file of this patent

UNITED STATES PATENTS

| Number | Name | Date |
| --- | --- | --- |
| 1,617,489 | Lightfoot | Feb. 15, 1927 |
| 1,640,049 | Nesmith | Aug. 23, 1927 |
| 1,766,068 | De Lannoy | June 24, 1930 |
| 1,844,263 | Alex | Feb. 9, 1932 |
| 2,222,883 | Smith | Nov. 26, 1940 |
| 2,450,921 | Smith | Oct. 12, 1948 |